2,776,239

PIPERONYLIDENE TETRAHYDROFURANONE

Daniel C. Rowlands, Worthington, Ohio, assignor, by mesne assignments, to Air Reduction Company, Incorporated, New York, N. Y., a corporation of New York No Drawing. Application August 2, 1955,
Serial No. 526,077

8 Claims. (Cl. 167—33)

This invention relates to a novel chemical compound and to a process of preparing the same. This invention further relates to insecticidal compositions, and more particularly to insecticidal compositions containing pyrethrum or allethrin.

It is well known in the art that insecticidal compositions containing pyrethrum or allethrin are widely used to combat insect pests, such as flies, mosquitos, moths, roaches, and the like. While these insecticidal compositions have good toxic properties and have been used satisfactorily for the control of household insects and the like, they have certain disadvantages. For example, since the production of pyrethrum and its derivatives in this country is hampered by the high costs of harvesting, large amounts are imported annually. The manufacturer of pyrethrum insecticides is thus forced to import pyrethrum at considerable expense; his sources of supply are not stable; and the prices of pyrethrum fluctuate unpredictably. Further, the action of the commercial pyrethrum insecticides tends toward paralysis rather than outright killing of insects, so that a considerable number of the insects sprayed with such an insecticide completely recover. If the concentration of the paralytic ingredient (pyrethrum) is increased, the cost of the spray produces a serious sale resistance.

Allethrin can be formulated in the same way as natural pyrethrum, in sprays, emulsifiable concentrates, aerosols, etc. Against many species of insects, allethrin shows the same general toxicity as the natural pyrethrins; but with a number of other species, for example the cockroaches (Blatella and Periplaneta), allethrin gives considerably poorer control than the natural pyrethrum product. Since the price of allethrin is competitive with the natural pyrethrum, it offers no significant commercial advantage.

One object of this invention is to provide a novel compound and a method of making the same.

A further object is to provide a new and improved insecticidal composition.

A still further object is to enhance the insecticidal effectiveness of pyrethrum or allethrin by combining either one with an activator or synergist.

Another object is to provide a relatively inexpensive chemical compound which will replace a substantial amount of the expensive toxic agents now required to produce a satisfactory insecticidal composition.

These and other objects and advantages of the present invention will become more apparent from the following description of specific embodiments of the invention. While the specific embodiments will serve to illustrate the invention more fully, they are not to be construed as limiting the scope of the invention.

The novel chemical compound is 4-piperonylidene-2,2,5,5-tetramethyltetrahydro-3-furanone, which can be represented by the formula:

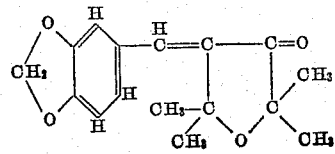

This compound can be obtained by reacting piperonal with tetramethyltetrahydrofuranone in the presence of sodium hydroxide, ethanol, and water. The procedure used for preparation was as follows:

Sodium hydroxide (13.0 g., 0.325 mole), ethanol (100 ml.), and water (98 ml.) were placed in a container. Tetramethyltertrahydrofuranone (31.2 g., 0.22 mole) was added first and then piperonal (33.0 g., 0.22 mole). The mixture was stirred for twelve hours. The solid product was recovered by filtration and washed with a large volume of water. It was then recrystallized from an ethanol solution to obtain bright yellow 4-piperonylidene - 2,2,5,5 - tetramethyltetrahydro - 3 -furanone (43.0 g., 71% yield, M. P. 69–740 C.). The wide melting range is probably explained by the coexistence of cis- and trans-isomers.

We have found that the novel furanone derivative, while possessing little or no insecticidal properties in itself, increases the toxic effect of pyrethrum or allethrin to a decidedly advantageous extent. For example, when the novel compound is incorporated in a suitable spraying medium with pyrethrum or allethrin, the resulting insecticidal composition has a higher knockdown action and killing effect against an insect such as the ordinary housefly than the combined effect of the compound and any one of the aforementioned known toxic agents. The liquid spray medium may consist, for example, of a hydrocarbon or mineral oil type, such as odorless kerosene, naptha, and so forth. The proposed insecticidal composition also possesses satisfactory concomitant physical properties, such as freedom from offensive odor, skin irritation, and other injurious effects on warm-blooded animals. The invention thus provides an improved and novel insecticidal composition comprising the furanone derivative and pyrethrum or allethrin.

The synergistic activity of the novel compound with pyrethrum and allethrin is shown in the following table in which the results were obtained by the Peet-Grady method as described on pages 92 to 98 of "Pyrethrum Flowers" by C. B. Gnadinger, 1936 edition. The insecticidal compositions contain either pyrethrum or allethrin, 0.025 g. per 100 ml. of odorless kerosene. The synergist, 4-piperonylidene-2,2,5,5-tetramethyltetrahydro-3-furanone, amounted to 0.2 g. per 100 ml. of the kerosene solution. About 500 flies were used for each test. For the purpose of this study, the percentages of flies knocked down at 5 and 10 minutes and killed at 24 hours were recorded.

| Insect-paralyzing agent | Synergist (Grams per 100 ml.) | Knockdown, percent | | Mortality, percent in 24 hrs. |
|---|---|---|---|---|
| | | 5 min. | 10 min. | |
| Pyrethrum | None | 21 | 24 | 4 |
| Do | None | 24 | 26 | 3 |
| Do | 0.2 | 34 | 54 | 16 |
| Do | 0.2 | 20 | 40 | 17 |
| Allethrin | 0.2 | 47 | 74 | 32 |
| Do | 0.2 | 33 | 64 | 28 |

The above table shows that the insecticidal composition comprising pyrethrum or allethrin and the new compound has greater insecticidal value against the insects to be combated than a composition comprising only pyrethrum or allethrin (since allethrin has practically the same toxicity as pyrethrum). It is apparent that a composition of the novel compound with pyrethrum or allethrin has much greater toxicity than either pyrethrum or allethrin, as shown by the percent of kill. Further, since the furanone derivative is a relatively inexpensive synergist, its formulation with pyrethrum or allethrin permits smaller percentages of either pyrethrum or allethrin, and this helps to decrease the cost of the insecticide per unit of effectiveness.

From the examples given in the above table, it will be noted that the insecticidal composition comprising allethrin and the novel compound has an insecticidal value greater than the composition comprising pyrethrum and the novel compound. The percent of knockdown and the percent of kill for the composition containing allethrin are much higher than the respective percentages for the composition containing pyrethrum. This result is especially surprising since it is contrary to what would have been predicted in view of the prior art. Since exceedingly little is known about the structural requirements for a good synergist, it is difficult to explain why the novel compound is more effective as a synergist with alethrin than with pyrethrum but the fact remains that the furanone derivative is surprisingly synergistic with allethrin.

The above examples are not to be construed as limiting either the methods of preparation of this novel compound and novel insecticidal composition or the kinds of insects to which such composition may be applied. The proportions of the insect-paralyzing agent and the novel compound may be varied over a wide range. If used as a dust, the novel insecticidal composition may include an inert powdered carrier; and, if used as a spray, such composition may contain an inert, mutual solvent.

What is claimed is:

1. A new chemical compound, 4-piperonylidene-2,2,5,5-tetramethyltetrahydro-3-furanone.
2. A process of preparing 4-piperonylidene-2,2,5,5-tetramethyltetrahydro-3-furanone which comprises reacting piperonal with tetramethyltetrahydrofuranone in the presence of ethanol, sodium hydroxide, and water.
3. An insecticidal composition comprising a product selected from the class consisting of pyrethrum and allethrin, and as a synergist therefor 4-piperonylidene-2,2,5,5-tetramethyltetrahydro-3-furanone.
4. An insecticidal composition comprising pyrethrum and 4 - piperonylidene - 2,2,5,5 - tetramethyltetrahydro-3-furanone as a synergist therefor.
5. An insecticidal composition comprising allethrin and 4 - piperonylidene - 2,2,5,5 - tetramethyltetrahydro-3-furanone as a synergist therefor.
6. The method of combating insects which comprises dispersing over the insect infested area an insecticidal composition comprising a product selected from the class consisting of pyrethrum and allethrin, and as a synergist therefor 4 - piperonylidene - 2,2,5,5 - tetramethyltetrahydro-3-furanone.
7. The method of combating insects which comprises dispersing over the insect-infested area an insecticidal composition comprising pyrethrum and 4-piperonylidene-2,2,5,5-tetramethyltetrahydro-3-furanone as a synergist therefor.
8. The method of combating insects which comprises dispersing over the insect-infested area an insecticidal composition comprising allethrin and 4-piperonylidene-2,2,5,5-tetramethyltetrahydro-3-furanone as a synergist therefor.

References Cited in the file of this patent

UNITED STATES PATENTS

| 2,421,570 | La Forge | June 3, 1947 |
| 2,434,856 | La Forge | Jan. 20, 1948 |
| 2,514,325 | Fried | July 4, 1950 |

OTHER REFERENCES

Beilstein: Handbuch der Organisch. Chem., vol. XIX, 1st Supp., page 814.

Tamate: Japan 1346 (1951) reported in Chem. Abst., vol. 47, page 4917 (1953).